United States Patent [19]

Koehler et al.

[11] Patent Number: 5,008,606
[45] Date of Patent: Apr. 16, 1991

[54] DEVICE FOR CONTROLLING VIBRATION-FREE MOVEMENT OF AN OPTICAL ELEMENT IN A STELLAR INTEFEROMETER AND STELLAR INTERFEROMETER COMPRISING SAME

[75] Inventors: Bertrand Koehler, Cannes; Emmanuel Manil, Le Cannet Rocheville; Jacques Chapellier, Le Cannet, all of France

[73] Assignee: Aerospatiale Societe Nationale Industrielle, Paris, France

[21] Appl. No.: 509,821

[22] Filed: Apr. 17, 1990

[30] Foreign Application Priority Data

Apr. 17, 1989 [FR] France .................................. 89 05060

[51] Int. Cl.$^5$ ............................................. B64C 17/06
[52] U.S. Cl. .................................. 318/649; 360/78.12; 244/17.27; 280/707
[58] Field of Search ...................... 318/649; 360/78.12; 244/17.27; 280/707; 350/504; 356/345

[56] References Cited

U.S. PATENT DOCUMENTS

| | | |
|---|---|---|
| 3,701,499 | 10/1972 | Schubert et al. .................. 244/17.27 |
| 4,023,906 | 5/1977 | Sica, Jr. ............................ 356/345 |
| 4,505,588 | 3/1985 | Ludman et al. . |
| 4,626,078 | 12/1986 | Chernin et al. .................... 350/504 |
| 4,715,289 | 12/1987 | Okamoto et al. ................... 280/707 |
| 4,746,143 | 5/1988 | Okamoto et al. ................... 280/707 |
| 4,765,648 | 8/1988 | Mander et al. ..................... 280/707 |
| 4,967,293 | 10/1990 | Aruza et al. ..................... 360/78.12 |

FOREIGN PATENT DOCUMENTS

0281906 9/1988 European Pat. Off. .
2593455 7/1987 France .

Primary Examiner—William M. Shoop, Jr.
Assistant Examiner—Saul M. Bergmann
Attorney, Agent, or Firm—Browdy and Neimark

[57] ABSTRACT

A carriage moves on a track and carries, through a flexible linkage, a chassis to which is fixed a payload including an optical element. A linear actuator controls the linkage so as to correct imperfections in displacement of the payload. A piezo-electric accelerometer delivers a filtered signal to control the linear actuator so as to eliminate the effect on the payload of vibration of the carriage. There are two independent control loops, one for controlling the carriage and the other for controlling the chassis. The device is applicable to controlling the mobile part of an optical delay line or of a telescope in a stellar interferometer.

15 Claims, 7 Drawing Sheets

DEVICE FOR CONTROLLING VIBRATION-FREE MOVEMENT OF AN OPTICAL ELEMENT IN A STELLAR INTEFEROMETER AND STELLAR INTERFEROMETER COMPRISING SAME

BACKGROUND OF THE INVENTION

1. Field of the invention

The present invention concerns an improved device for controlling movement of a mobile member such as an optical element of a stellar interferometry system or, more generally, an interferometry device such as a FOURIER transform spectrometer.

Its object is to stabilize dynamically a mobile member during a programmed movement so as to eliminate the effect of vibrations.

2. Description of the Prior Art

Programmed vibration-free displacement of this kind is needed, for example, to control an optical delay line within a coherent recombination type stellar interferometer. In this case, where the distance (called the base) between the telescopes is in the order of 100 meters, equalizing the optical paths, despite the rotation of the Earth, requires displacement of the reflector of the optical delay line over a distance of several meters, at a speed of several tens of millimeters per second, with an average positional accuracy of a few microns and with an instantaneous accuracy (during a setting time of a few hundredths of a second) of a few nanometers (amplitude of the vibrations): the constraints are therefore more severe in respect of the dynamic error than in respect of the static error.

Such displacement characteristics are also necessary if the optical paths are equalized by moving the telescopes themselves.

A doctoral thesis by L. KOECHLIN submitted to the University of Nice on 15 Nov. 1985 under the title "Exploitation astrophysique de l'interféromètre àdeux télescopes du CERGA" ("Astrophysical application of the CERGA two-telescope interferometer") there is described an optical bench for recombining the interferometer beams serving as a delay line.

This table moves on accurately machined rails. It is driven by a torque motor with position and speed control. The transmission system uses a precision lead screw and nut coupling.

This type of displacement device has the disadvantage of producing vibration, especially at high speeds (a few millimeters per second), such vibration originating from the guidance system and also from the transmission. This vibration compromises the accuracy of the fringe contrast measurements.

An air cushion guidance system represents an improvement, but flow instabilities often generate non-negligible high-frequency vibrations.

The 1986 MIT thesis by R.W. HOLM entitled "A High Speed High-Resolution Optical Delay Line for Stellar Interferometry Applications" discloses a device for displacing a "cat's eye" reflector in a delay line comprising a slave carriage moving on rails and comprising a chassis mobile on flexible pivots to which the cat's eye is fixed.

The secondary mirror of the cat's eye is carried by a piezo-electric actuator. The position of the mobile chassis relative to the carriage is controlled by a displacement detector and a loudspeaker voice coil type linear actuator. Finally, the carriage is moved by a stepper motor.

The optical path introduced by the delay line is measured by a laser interferometer. The error signal is injected into the control loop of the piezo-electric actuator. Saturation of this actuator is avoided by the action of the linear actuator and saturation of the linear actuator is avoided by the action of the stepper motor (hence the above use of the term "slave"). There are therefore three control loops nested one within the other.

This displacement device makes it possible to achieve vibration-free displacement of the cat's eye similar to friction-free displacement. It offers good performance because the error signal corresponds directly to the magnitude to be controlled, that is to say to the optical path.

On the other hand, it is ill suited to high speeds because the laser measurement system would then have to have a resolution of a few nanometers while the ratio of the maximum speed of variation of the optical path of the carriage to the resolution is limited by the electronic circuitry for reasons of feasibility.

Also, the piezo-electric actuator cannot apply sufficient force for this device to be applicable to the movement of large masses such as telescopes.

Finally, this device is costly because of the presence of the three control loops and because of the need to have a high-performance laser measurement system which can only function correctly in a vacuum.

A device of this type is described in the publication: P. CONNES 1975 Applied Optics, Vol 14 No 9, p 2067–2084.

An object of the present invention is to describe a device for programmed displacement of a carriage carrying, through a flexible linkage, a payload which must be moved without vibration over great distances and at high speed, as in the delay lines of a stellar interferometer, and having none of the disadvantages mentioned above.

SUMMARY OF THE INVENTION

The invention consists in a device for static and dynamic control of vibration-free displacement of a mobile optical element of an interferometry device comprising a guide track, a carriage carrying a payload including said optical element and movable along said guide track, a drive motor by which said carriage is driven along said guide track, drive control means connected to said drive motor and adapted to cause said carriage to be driven according to a predetermined law, flexible linkage means between said payload and said carriage enabling relative movement between said payload and said carriage parallel to the direction of displacement of said optical element, one stabilization control loop independent of said drive control means, one accelerometer carried by said payload, responsive to acceleration of said payload parallel to said direction of displacement of said optical element and connected to said stabilization control loop, an actuator operative between said payload and said carriage under the control of said stabilization control loop, a filter means in said stabilization control loop for filtering signals from said accelerometer, a control loop in said drive control means and a position sensor connected to said control loop and adapted to sense the position of said carriage on said guide track.

In practise the payload is provided with an accelerometer measuring acceleration in the direction of displacement of the carriage and carries a primary element of a linear electromagnetic actuator the secondary element of which is fixed to the carriage and the force applied by the linear motor is controlled by the signal from the accelerometer so that vibrations of the carriage are not transmitted to the payload.

Preferred features of the invention include:

the filter means of the stabilization control loop is a second order filter having a transfer function F(p) of the form:

$$F(p) = \frac{a_2 p^2 + a_1 p + a_0}{p^2 + b_1 p + b_0}$$

$p = j\omega$ is the Laplace variable;

$a_0, a_1, a_2$ and $b_0, b_1$ are fixed coefficients, the accelerometer is of the piezo-electric or slaved pendulum type, the actuator is of the voice coil type, the guide track uses crossed rollers, the drive motor is a brushless linear motor, the position sensor is an incremental type sensor, the drive control loop is a digital position/speed control loop, the optical element is a "cat's eye" reflector in a delay line, the optical element is one of the telescopes of the stellar interferometer, mobile towards a recombination station.

The invention also consists in a stellar interferometer comprising one or more displacement control devices of the aforementioned type.

The stabilization control loop provided by the invention might seem in itself to have analogies with antivibration devices previously proposed in fields totally different to that to which the invention relates, but these devices are usually employed in a technical field where there is no requirement for so high a degree of damping (FR-2.593.455, WO-81/00237, FR-2.415.330 or EP-0.222.329) and are generally complex, sometimes involving the measurement of several parameters including positions and forces or moments. There is also known from the document EP-0.202.880 a high-performance antivibration device, but this is the only control element that is operative since the source of vibration is fixed (it is the ground itself). Also, the amplitudes of the disturbing accelerations to be eliminated are much lower than in the field of the invention because the high-speed displacement of the carriage is inevitably accompanied by significant disturbances (guidance irregularities, friction, etc). Finally, the control laws described do not provide any way to eliminate the effects of any bias in the accelerometer signal.

In practise the novelty of the invention resides notably in the fact that, to damp very effectively vibrations of an optical element mobile along a given path with given kinetic properties, it teaches, in a way that goes counter to the received wisdom of those skilled in the art, dispensing with any interconnection between the drive and stabilization control systems; surprisingly, the resulting great simplicity (and high reliability) are combined with excellent damping.

Objects, characteristics and advantages of the invention will emerge from the following description given by way of non-limiting example with reference to the appended diagrammatic drawings.

DETAILED DESCRIPTION OF THE INVENTION

Figure 1:
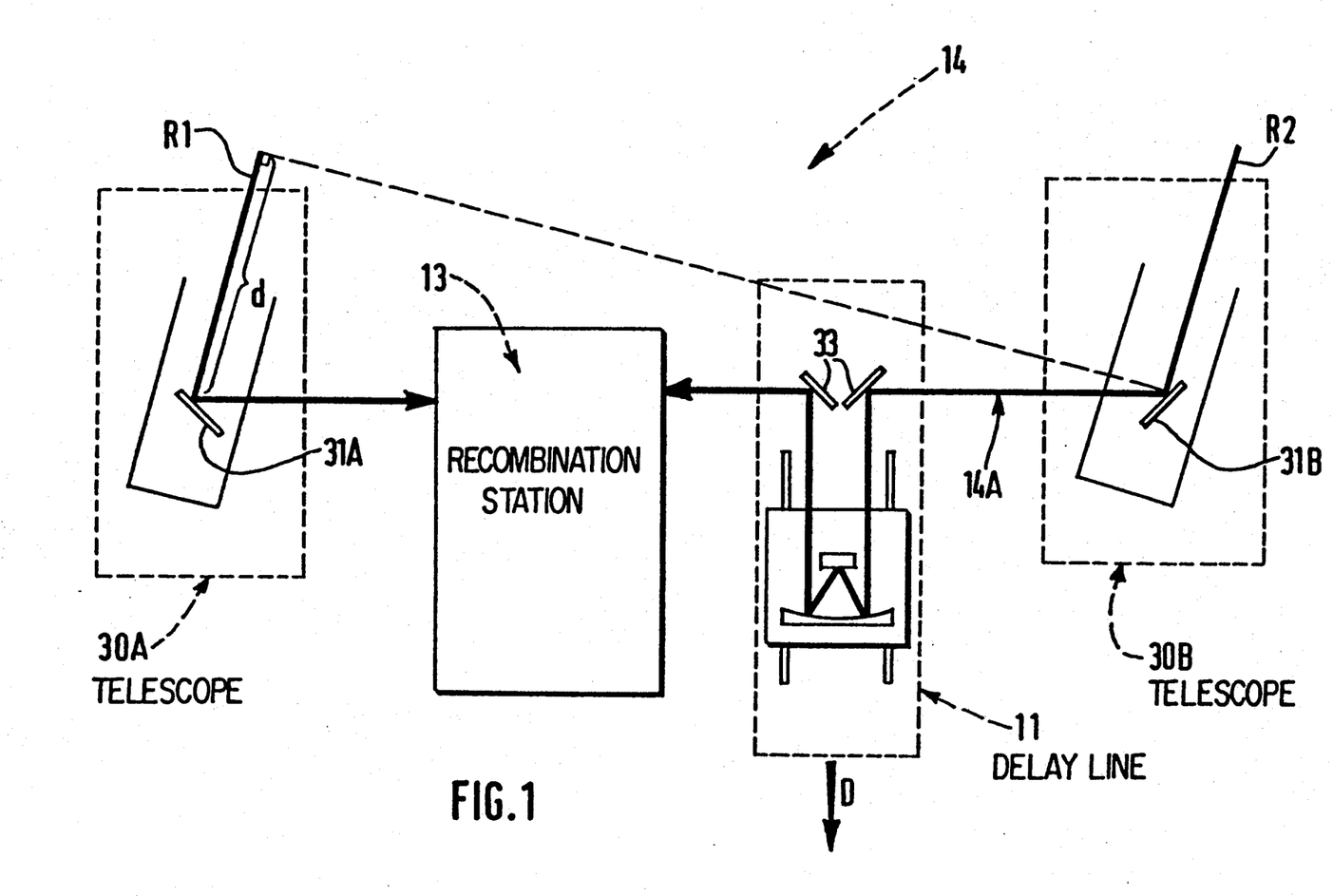
FIG. 1 is a general schematic view of a stellar interferometry system incorporating a vibration-free programmed displacement control device in accordance with the invention.

FIG. 1 shows a stellar interferometer 14 comprising two telescopes 30A and 30B receiving respective rays R1 and R2 from the same heavenly body (not shown). The telescopes comprise mirrors 31A and 31B which reflect the incident radiation to a wave recombination station 13 in which are formed interference fringes characteristic of the radiation emitted by the heavenly body.

The problem is to adjust continuously the optical path in one arm 14A of the stellar interferometer so as to compensate continuously for path differences d related to variations in the position of the object under observation in the sky. FIG. 1 shows the path difference to be compensated. It has the value B.sin Z where B is the distance between the telescopes 30A and 30B and Z is the zenith angle of the object. The optical path may be adjusted either by displacing the telescopes relative to the recombination station 13 or by introducing into one arm of the interferometer a so-called "delay line" device 11 consisting of a reflector mobile in a direction D.

The first solution has the advantage of enabling continuous control of the geometrical configuration of the interferometer, which makes it possible to optimize the coverage of the measured spatial frequency plane ((u, v) plane) and to minimize the number of reflecting surfaces on the optical path.

The second solution, that described in detail here, has the advantage of being simpler to implement and use.

The requirement technical specifications for a delay line device depend essentially on the distance between the telescopes, the angle of the line between the telescopes to the North-South axis, the position in the sky of the objects to be observed, the exposure time during which the image of the interference fringes is integrated and the precision required for measuring the fringe contrast. The essential specifications are:

1. The linear travel of the mobile assembly of the delay line (a few meters).

2. The speed of displacement of the reflector (variable between zero and a few tens of millimeters per second).

3. The average precision of the positioning of the mobile assembly, i.e. the reflector (a few micrometers).

4. The level of vibration of the reflector relative to its mean position during displacement. The vibration level is the most critical parameter as it conditions the precision (a few percent) with which the fringe contrast can be measured. It is expressed as a mean quadratic position error (a few nanometers) in a time window corresponding to the exposure time (a few tens of milliseconds).

The difficulty is to meet simultaneously specifications 2 and 4 from the above list.

Figure 2:
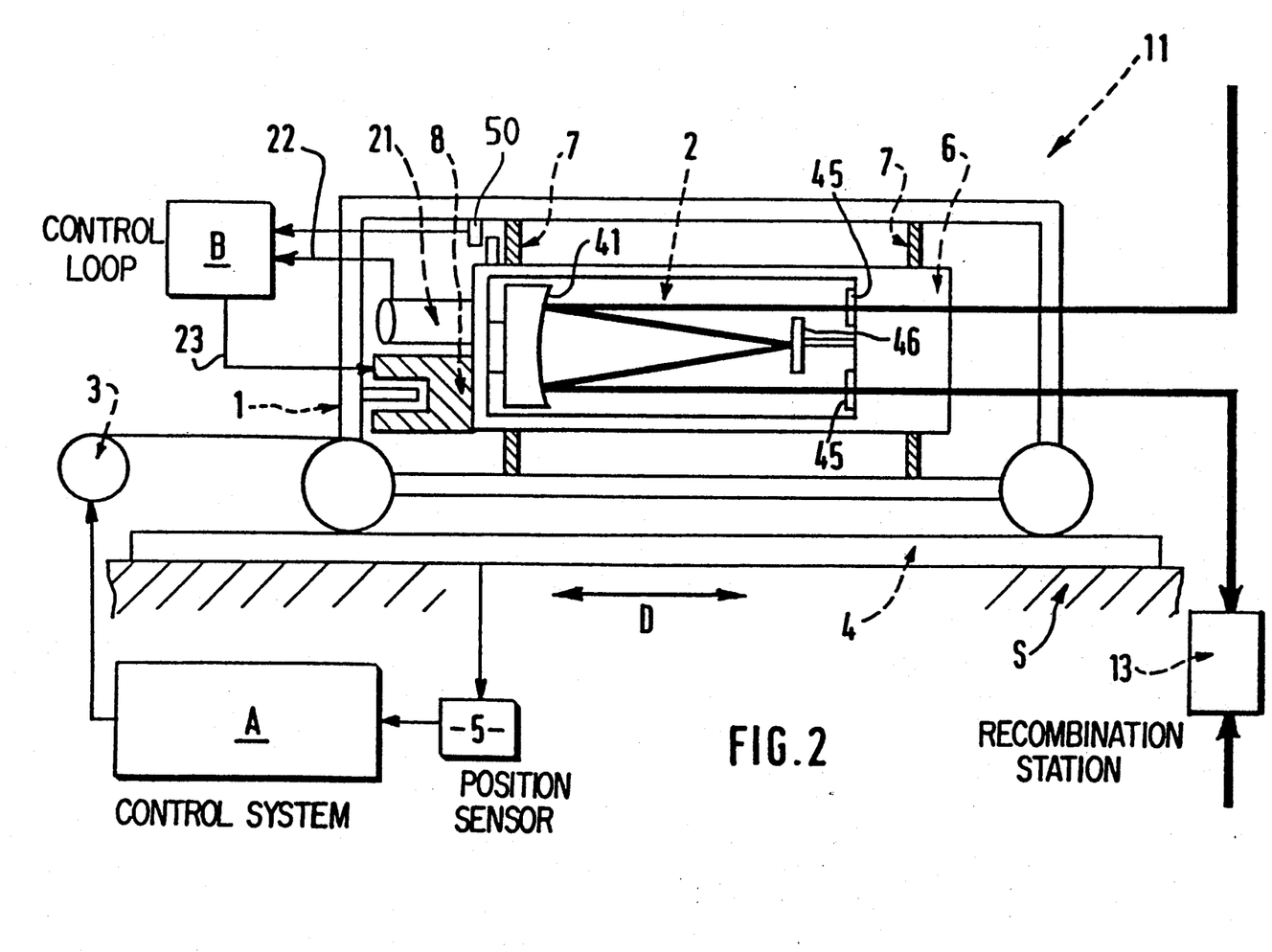
FIG. 2 is a schematic view of this device.
Figure 3:
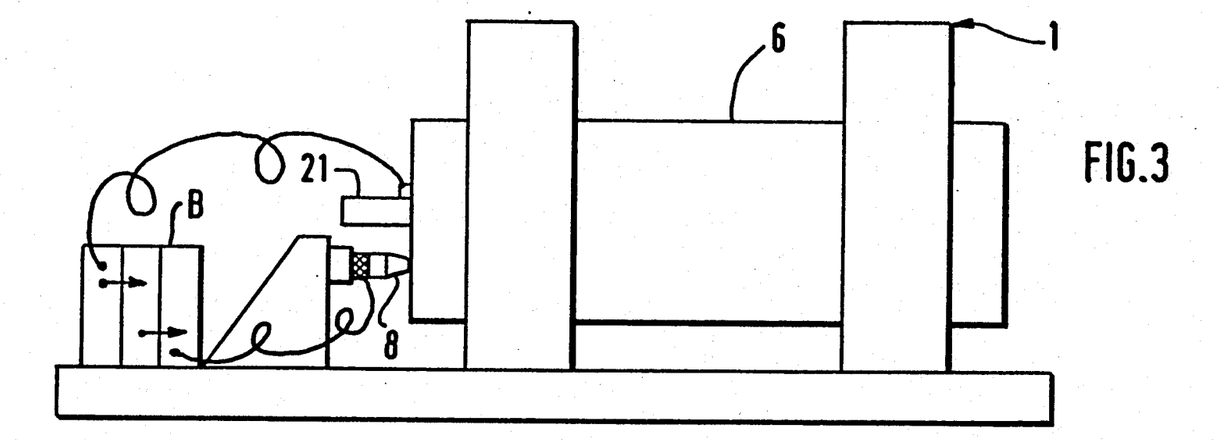
FIG. 3 is a view of it in side elevation.

These constraints are met by the device from FIG. 2.

Referring again to FIG. 1, note first that to make the diagram clearer the direction D has been shown in the same plane as the rays R1 and R2, in other words in a substantially vertical plane. However, this direction is horizontal in practise; to achieve this it is sufficient to orient appropriately the mirrors 33 at the entry to and the exit from the delay line 11. The direction D is preferably, but not necessarily, perpendicular to the common direction of the rays entering and leaving the delay line.

Similarly, in FIG. 2, corresponding essentially to a view in a vertical plane, the optical path has been shown in this plane for convenience although in practise it is in a horizontal plane.

In addition to the previously mentioned mirrors 33 the delay line 11 comprises a displacement control device that can be broken down into a translation unit and a stabilization stage carried by the latter.

The translation unit comprises a base S carrying a guide device 4, a mobile carriage 1, a motor 3 and transmission system and a position sensor 5 connected to a control system A (with a power stage) controlling the motor 3 in accordance with output signals from the position sensor and a predetermined set point law.

For cost reasons the translation unit is constructed from commercially available components. Various technologies are available: guidance by rollers on accurately machined rails, by recirculating balls, by friction, by crossed rollers, by air cushions, etc, transmission by belts, by friction roller shaft drives, by recirculating ball precision lead screw and nut systems, etc, drive by DC motors, torque motors, stepper motors, linear motors, etc.

The principal requirement of the device being a low level of vibration in movement, the choice between these various technologies is dictated by the level of vibration generated by each element.

Guidance by rollers on accurately machined rails is a good solution but not one that is generally available "off the shelf". Recirculating ball and friction guidance systems generate vibrations, especially at high speeds. Guidance by cross rollers without recirculation is better than recirculating ball guidance systems, but is ill suited to long travels (more than 1 m). Air cushion guidance can represent an improvement, although instabilities in the air flow can generate significant vibration in the frequency range between 100 and 1 000 Hz.

Belt drives usually give rise to longitudinal vibration generated by the flexibility of the belt. A rod and roller transmission system can be used only for short travels. A lead screw and nut transmission system is ill suited to high-speed displacement and long travels.

A torque motor gives good performance at low speeds and enables direct drive, eliminating vibration generated by a speed reducer. A stepper motor is not suitable because the passage through the successive steps results in longitudinal vibration of the mobile carriage. A linear motor has the advantage of generating a force directly between the base and the mobile carriage, without contact, so eliminating the source of vibration represented by a transmission mechanism.

The solution adopted here is a 1 m travel translation unit comprising a steel base 5, a crossed-roller guidance system 4, a fixed permanent magnet brushless linear motor 3, an optical rule type incremental position sensor 5 and a digital position/speed control system. This equipment is manufactured by the American company ANORAD, for example, with the product references ANORIDE 14-40 and IAC-186.

The stabilization stage carried by the carriage 1 includes a flexible linkage 7 linking a chassis 6 to the carriage, a payload 2 fastened to the chassis, an inertial sensor such as an accelerometer 21, a linear actuator 8 and a control loop B. In the context of an optional modification to be described later, the stabilization stage may also comprise a second position sensor 50 measuring the position of the payload 2 relative to the carriage 1.

Figure 4:
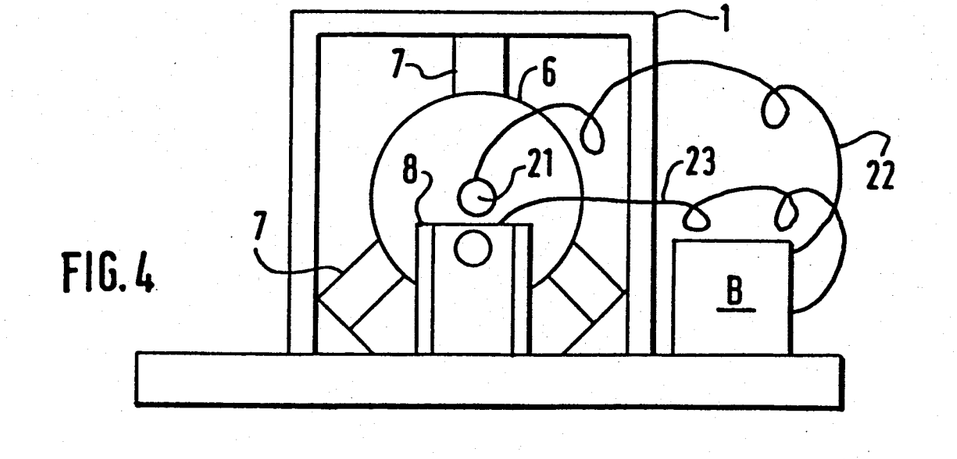
FIG. 4 is a lefthand side view of it.

The role of the flexible linkage 7 is to enable relative displacement in the direction D between the carriage 1 and the chassis 6. Here this linkage is implemented by two axially offset sets of three flexible blades disposed at 120°, as shown in FIG. 4. This linkage has the advantage of having no backlash and no friction. The natural frequency of the linkage is around 5 Hz for a combined mass of the chassis and payload of 15 kg. In an alternative embodiment (not shown) the linkage could be just the highest blade from each set, relying on gravity.

To make FIG. 4 clearer the cover part of the carriage has been reduced to two portions carrying the flexible linkage 7, so that the chassis 6 and the associated elements can be seen.

Figure 5:
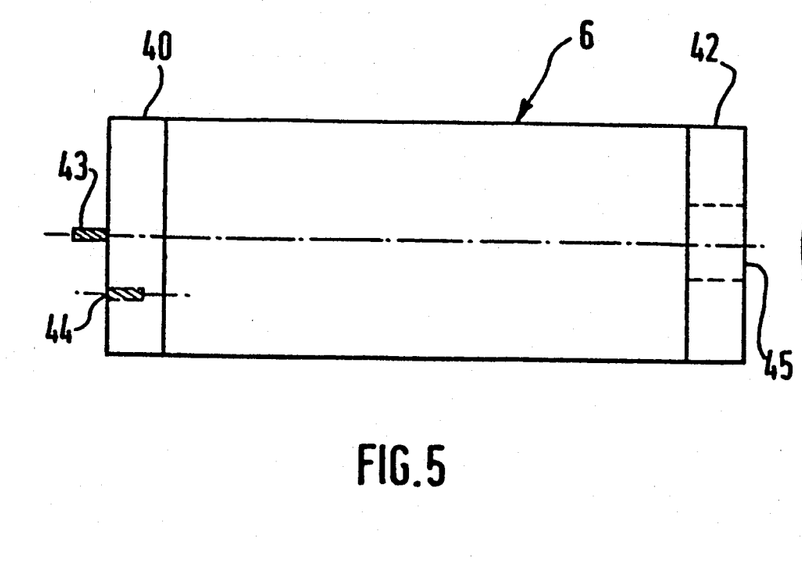
FIG. 5 is a partial view showing the chassis of this device in side elevation.
Figure 6:
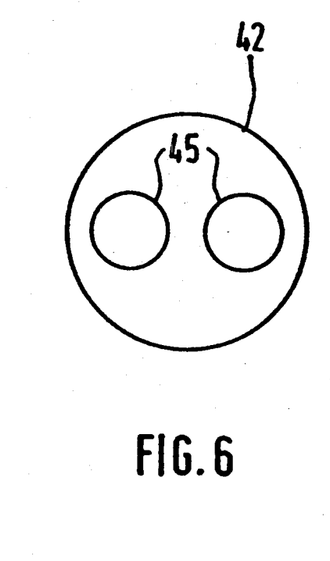
FIG. 6 is a righthand view of this chassis.
Figure 7:
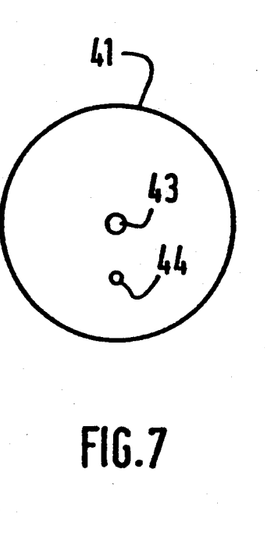
FIG. 7 is a lefthand view of it.

As is clear from FIGS. 5 through 7 in particular, the chassis 6 is an Invar tube (600 mm long, 250 mm in diameter, weighing 3 kg, for example) closed at one end by a plug 40 carrying a primary mirror 41 and at the other end by a closure plate 42. On the rear surface of the plug is a 7 mm M8 screw 43 at the center of the surface intended to receive the accelerometer 21 and a 5 mm M3 threaded bore 44 65 mm below the screw 43 and designed to receive the mobile part of the linear actuator 8. The closure plate comprises two circular openings adapted to receive two windows 45 for closing the enclosure formed by the chassis.

The payload 2 is a "cat's eye" type reflector comprising the primary mirror 41, a secondary mirror 46 and the two closure windows 45. This device returns the incident light beam in the opposite direction and is highly insensitive to any lateral and angular movement due to imperfections of the guidance system 4. The closure windows seal the interior of the chassis against ingress of dust to avoid any deterioration in the optical qualities such as would result from a deposit of dust on the mirrors. The primary mirror 41 is a "Zerodur" parabolic mirror with a diameter of 200 mm and a thickness of approximately 20 mm, weighing 3 kg. The secondary mirror 46 is a 10 mm diameter plane mirror; the closure windows 45 are in BK7 glass, 3 mm thick, 80 mm in diameter, with an anti-reflection coating. The primary mirror is coupled to the plug. The secondary mirror and the closure windows are fixed to the plate 42 which closes the chassis 6.

The accelerometer 21 is a sensor which detects acceleration of the chassis at very low levels in a wide band of frequencies. Piezo-electric accelerometers are suitable for this application.

The accelerometer used here is a BRUEL and KJAER 8318 with an associated BRUEL and KJAER 2813 amplifier. It is fixed to the center of the rear surface of the plug at the end of the chassis 6. It weighs 500 g.

The linear actuator 8 is designed to apply a force between the carriage 1 and the chassis 6. This force is determined by the control system B and is used to cancel vibrations of the chassis 6 measured by the sensor 21. The actuator 8 must supply a low level force in a wide band of frequencies. Voice coil type linear actuators as used in loudspeakers are very well suited to this application. The actuator used here is a PRODERA EX6 and its associated PRODERA 647/30 W amplifier. The body of the actuator is fixed to the carriage 1 and the mobile part including the coil is fixed to the rear surface of the plug at the end of the chassis 6.

The control system B receives the measurement signal from the measurement amplifier associated with the accelerometer 21. It computes from the measurement signal 22 a control signal 23 which is fed to the control amplifier associated with the linear actuator 8. The force delivered by the linear actuator 8 accelerates the chassis 6 in phase opposition to the acceleration measured by the sensor 21, so enabling the amplitude of vibrations of the chassis 6 to be controlled.

The control system B uses a second order filter:

$$\frac{\text{command signal}}{\text{measurement signal}}(p) = \frac{a_2 p^2 + a_1 p + a_0}{p^2 + b_1 p + b_0}$$

in which $p = j\omega$ is the Laplace variable.

This filter is easy to set up using a Kalman filter type formulation. It is equivalent to feedback of the filtered acceleration and the integral of the filtered acceleration. The filtered acceleration is obtained from the measurement signal 22 by passing it through a first order high-pass filter.

The advantage of the high-pass filter is that it eliminates the effects of any bias on the measurement signal. The advantage of the filtered acceleration feedback is that it enables modification of the natural frequency of the flexible linkage 7 to obtain a closed loop natural frequency suited to the requirements for filtering vibration from the carriage 1. The advantage of the filtered acceleration integral feedback is that it enables generation of a damping term.

This filter is an analog filter.

The Kalman filter type formulation amounts to constructing a payload speed estimator operating on the measured acceleration of the payload. This speed estimate is then taken as the "filtered acceleration integral" term referred to above.

The filter is based on the following mathematical model representing the movement of the payload 2:

$$M_2 \cdot \frac{d^2 X_2}{dt^2} = -K X_2 + F_2 \quad (I)$$

where $M_2$ is the mass of the payload 2, $$\frac{d^2 X_2}{dt^2}$$

is the acceleration of the payload 2,

K is the stiffness of the flexible linkage 7, and $F_2$ is the force applied to the payload 2 by the actuator 8.

This equation can also be written:

$$\frac{D^2 X_2}{dt^2} + \omega_0^2 X_2 = u_2 \quad (II)$$

with $\omega_0^2 = K/M_2$ and $u_2 = F_2/M_2$

The measurement signal 22 delivered by the accelerometer is representative of the acceleration of the payload 2, in other words $d^2 x_2/dt^2$. This measurement signal is denoted $Y_a$.

$$Y_a = \frac{d^2 X_2}{dt^2} = u_2 - \omega_0^2 X_2 \quad (III)$$

The dynamic equation of the filter is then of the form:

$$\frac{d}{dt}\begin{bmatrix} X_2 \\ \frac{dX_2}{dt} \end{bmatrix} = \begin{bmatrix} 0 & 1 \\ -\omega_0^2 & 0 \end{bmatrix}\begin{bmatrix} X_2 \\ \frac{dX_2}{dt} \end{bmatrix} + \begin{bmatrix} 0 \\ 1 \end{bmatrix} u_2 +$$

$$L\left( Y_a - u_2 - [-\omega_0^2 \; 0]\begin{bmatrix} X_2 \\ \frac{dX_2}{dt} \end{bmatrix}\right)$$

that is:

$$\frac{d}{dt} X = \begin{bmatrix} g_1 \omega_0^2 & 1 \\ g_2 \omega_0^2 - \omega_0^2 & 0 \end{bmatrix} X + \begin{bmatrix} -g_1 \\ 1 - g_2 \end{bmatrix} u_2 + \begin{bmatrix} g_1 \\ g_2 \end{bmatrix} Y_a$$

by substituting:

$$X = \begin{bmatrix} X_2 \\ \frac{dX_2}{dt} \end{bmatrix} \text{ and } L\begin{bmatrix} g_1 \\ g_2 \end{bmatrix}$$

By imposing for $\mu_2$ a term proportional to the acceleration and to the estimated speed we obtain:

$$u_2 - K_4 \cdot \frac{d^2 X_2}{dt} - K_5 Y_a$$

and the final corrector:

$$\frac{dX}{dt} =$$

$$\begin{bmatrix} g_1 \omega_0^2 & 1 + g_1 \cdot K_4 \\ (g_2 - 1)\omega_0^2 & K_4(g_2 - 1) \end{bmatrix} X + \begin{bmatrix} g_1(1 + K_5) \\ g_2(1 + K_5) - K_5 \end{bmatrix} Y_a$$

$$u_2 = [0 \; -K_4] X - K_5 Y_a$$

The gains $g_1$, $g_2$, $K_4$ and $K_5$ are set as follows:

$$g_1 = -\frac{2\, z_{Kal} \cdot \omega_{Kal}}{\omega_0^2}$$

$$g_2 = 1 - \frac{\omega_{Kal}^2}{\omega_0^2}$$

$$K_4 = \frac{2\, z_d \omega_0^2}{\omega_d}$$

$$K_5 = \frac{\omega_0^2}{\omega_d^2} - 1$$

where $z_{Kal}$ and $\omega_{Kal}$ are respectively the damping factor and the natural angular frequency of the KALMAN filter and $z_d$ and $\omega_d$ are respectively the damping factor and the natural angular frequency of the closed control loop B.

Figure 9:
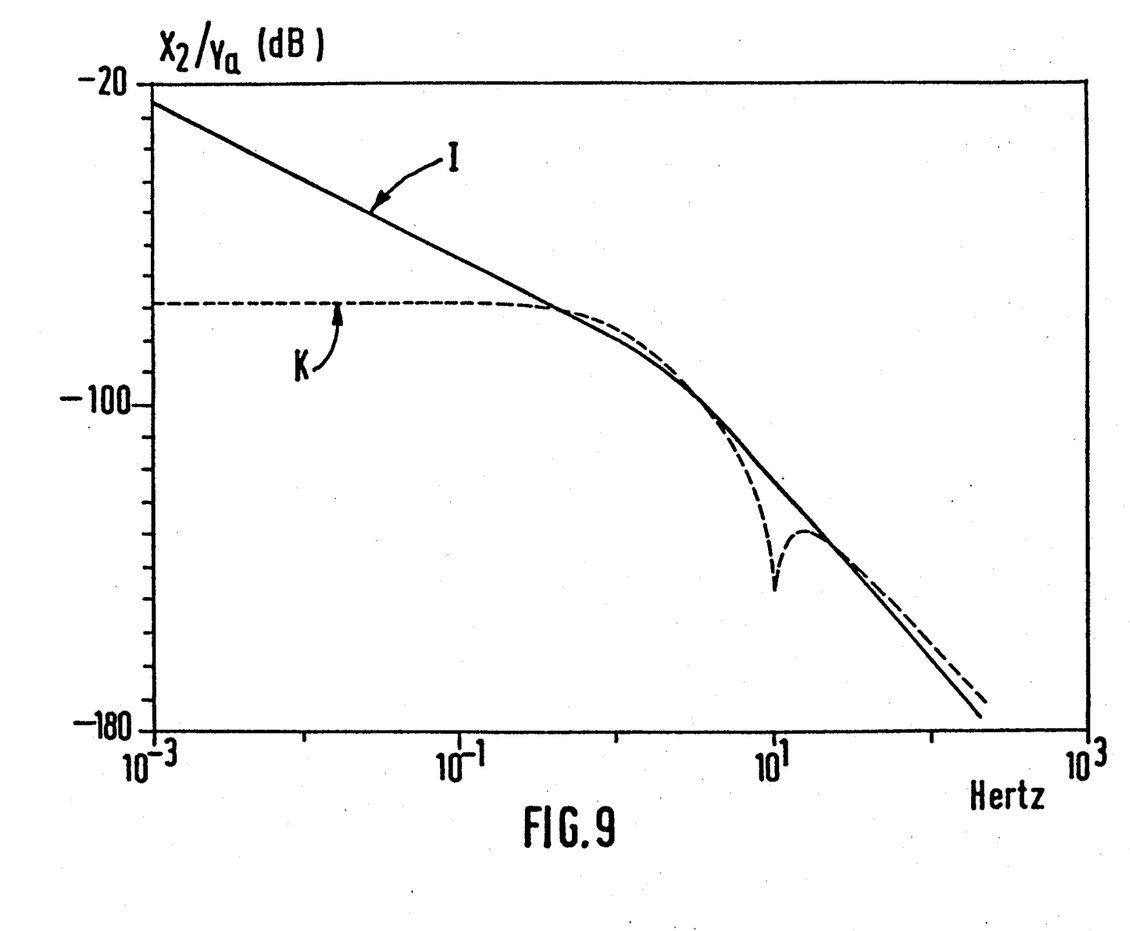
FIG. 9 is a graphic showing the performance of the control law of the invention.

The advantage of the Kalman filter (K) as compared with acceleration and acceleration integral (I) feedback is shown in FIG. 9 which represents the transfer function between the measurement signal $Y_a$ and the position $X_2$ of the payload 2: any bias on $Y_a$ at the output of the measurement amplifier is amplified in the (I) solution but not the (K) solution.

Figure 8:
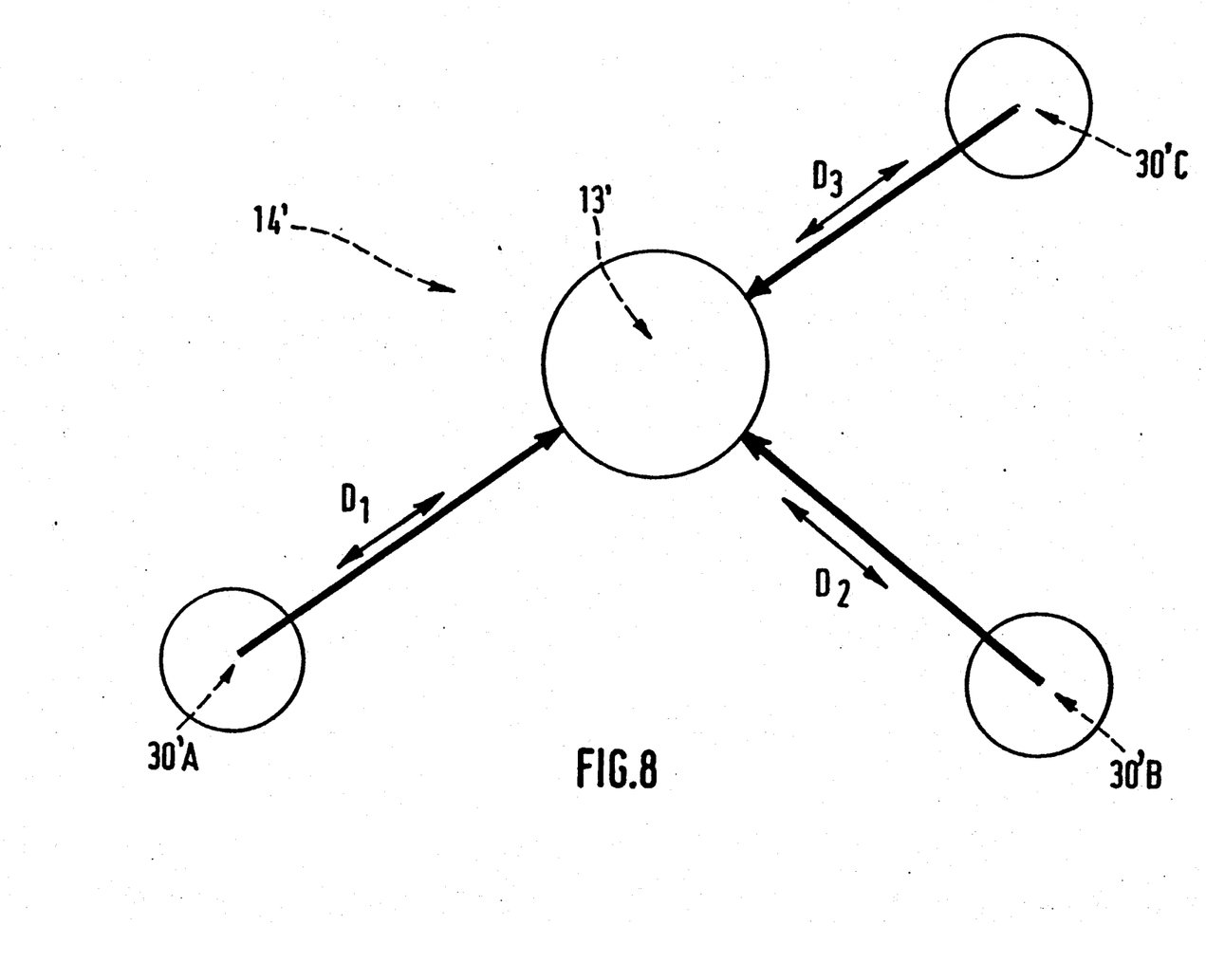
FIG. 8 is a schematic plan view of a stellar interferometry system comprising three telescopes each mounted on a vibration-free programmed displacement control device in accordance with the invention.

FIG. 8 represents a stellar interferometry configuration 14' comprising three telescopes 30'A, 30'B and 30'C that are not fixed but mobile and are aimed at the same object in the sky together with a recombination station 13' receiving the three beams returned by the telescopes to produce the fringes.

To eliminate the effect of the rotation of the Earth it would be possible to use delay lines as previously (generally different, and at least two in number); also, one "arm" of the interferometer would then send its radiation direct to the recombination station 13'.

Notwithstanding this, it may be advantageous in some cases, for astrophysical reasons, to have the telescopes mobile except for at most one of them.

In the FIG. 8 configuration the telescopes are mobile in a direction towards the recombination station, the payload 2 from FIG. 2 being replaced by the telescope itself, the dimensions of the component parts of the payload support device naturally being changed.

Figure 10:
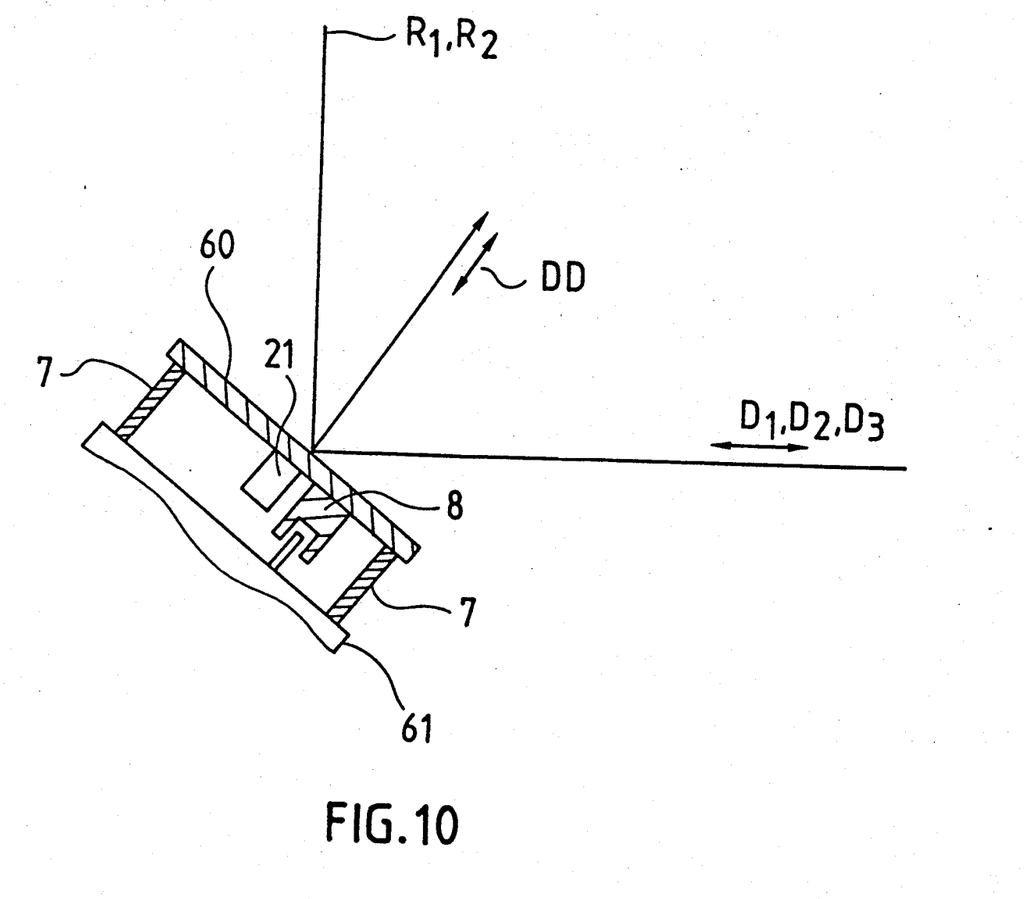
FIG. 10 is a view in side elevation of the vibration-free control device in the case where the optical element to be controlled is the tertiary plane mirror of a telescope or the plane mirror constituting a siderostat.

If the telescopes are mobile and sufficiently compact for their structure to be rigid or if the telescopes replaced by simple siderostats (plane mirror) it may be advantageous to place the payload support device including the stabilization control loop (B) at the tertiary plane mirror of the telescope or at the plane mirror which constitutes the siderostat, rather than between the telescope assembly and the mobile carriage which carries the telescope.

In this case the payload 2 is the plane mirror, the flexible linkage 7 links the plane mirror 60 to its support or "plug" 61, and the direction DD of permitted relative movement for this flexible linkage is the direction perpendicular to the plane of the mirror. The actuator 8 operates on the plane mirror in the direction of relative movement and the inertial sensor or accelerometer 21 is fixed to the back of the plane mirror and measures the acceleration of the plane mirror in the direction of relative movement. The signal 22 from the accelerometer is processed by the control loop B in the same way as already described. Note that in this case the direction D, $D_1$, $D_2$, $D_3$ of displacement of the telescope is no longer parallel to the direction of relative movement enabled by the flexible linkage 7.

It is of course possible to introduce modifications into the description given above without departing from the scope of the invention as defined by the appended claims. In particular, for improved control of low-frequency vibration it may be beneficial to use instead of the piezo-electric accelerometer 21 a slaved pendulum type accelerometer 21 or to add a second position sensor 50 measuring the relative position of the payload 2 and the chassis 6. These modifications are discussed below.

A slaved pendulum type accelerometer comprises a pendulum of given mass, a magnetic cage in which the pendulum is housed, a position sensor measuring the position of the pendulum in the cage, a torque motor adapted to exert a torque on the pendulum and a control loop adapted to hold the pendulum in a "zero" position. The torque supplied by the motor to maintain this "zero" position is then a measure of the force applied to the mass of the pendulum and therefore a measure of the acceleration to which the pendulum is subjected.

Various slaved pendulum accelerometer technologies are commercially available (flexible pivot, hinge pivot, silica pendulum, a magnetic material pendulum, etc). Accelerometers of this kind are manufactured by companies including SEPTA in France and SUNDSTRAND Corporation in the USA.

The slaved pendulum type accelerometers that are beneficial for this application (SEPTA A889 or Q-Flex) are of a size and have an external shape similar to those of piezo-electric type accelerometers and therefore can be substituted for these without difficulty. Of course, the sensitive axis of the slaved pendulum type accelerometer is parallel to the direction of the movement to be controlled (D, $D_1$, $D_2$, $D_3$).

The signal from the slaved pendulum type accelerometer is processed by the control loop B in the same way as in the solution using a piezo-electric type accelerometer.

The use of a slaved pendulum type accelerometer has the advantage of improved control over low-frequency vibration since, unlike the piezo-electric accelerometer, the slaved pendulum type accelerometer can measure acceleration at low frequencies down to zero frequency.

The addition of a second position sensor in addition to the initial sensor comprising the accelerometer, to measure the relative position of the payload 2 and the chassis 6 on a sub-micron scale, also enables improved control at low frequencies.

The second position sensor may be of the capacitative, inductive or some other type. Capacitative position sensors suitable for this application are marketed in France by the company "FOGALE nanotech".

The signal from the second position sensor is then processed in the control loop B, which is modified to accept the signal from the accelerometer 21 and the signal from the second position sensor 50. These two signals are processed by a "cross-over" method which entails low-pass filtering of the signal from the position sensor and high-pass filtering of the signal from the accelerometer before they are combined to produce the control signal 23.

It goes without saying that the foregoing description has been given by way of non-limiting example only and that numerous variations may be put forward by those skilled in the art without departing from the scope of the invention. In particular, the invention may be used in the delay lines of FOURIER transform spectroscopy devices.

There is claimed:

1. Device for static and dynamic control of vibration-free displacement of a mobile optical element of an interferometry device comprising a guide track, a carriage carrying a payload including said optical element and movable along said guide track, a drive motor by which said carriage is driven along said guide track, drive control means connected to said drive motor and adapted to cause said carriage to be driven according to a predetermined law, flexible linkage means between said payload and said carriage enabling relative movement between said payload and said carriage parallel to the direction of displacement of said optical element, a stabilization control loop independent of said drive control means, an accelerometer carried by said payload, responsive to acceleration of said payload parallel to said direction of displacement of said optical element and connected to said stabilization control loop, an actuator operative between said payload and said carriage under the control of said stabilization control loop, a filter means in said stabilization control loop for filtering signals from said accelerometer, a control loop in said drive control means and a position sensor connected to said control loop and adapted to sense the position of said carriage on said guide track.

2. Device according to claim 1 wherein said filter means in side stabilization control loop is a second order filter having a transfer function F(p) of the form:

$$F(p) = \frac{a_2 p^2 + a_1 p + a_0}{p^2 + b_1 p + b_0}$$

$p = j\omega$ is the Laplace variable;

$a_0$, $a_1$, $a_2$ and $b_0$, $b_1$ are fixed coefficients.

3. Device according to claim 1 wherein said accelerometer is a piezo-electric accelerometer.

4. Device according to claim 1 wherein said accelerometer is a slaved pendulum accelerometer.

5. Device according to claim 4 wherein a second position sensor measuring the position of said payload relative to said chassis is incorporated into said stabilization control loop to control said actuator.

6. Device according to claim 1 wherein said actuator is of the loudspeaker voice coil type.

7. Device according to claim 1 wherein said guide track is a crossed roller guide track.

8. Device according to claim 1 wherein said drive motor is a brushless linear motor.

9. Device according to claim 1 wherein said position sensor is an incremental sensor.

10. Device according to claim 1 wherein said drive control loop is a digital position/speed control loop.

11. Device according to claim 1 wherein said optical element is a "cat's eye" reflector.

12. Device according to claim 1 wherein said optical element is a telescope.

13. Stellar interferometer comprising at least two telescopes, an interferometry recombination station and at least one device for static and dynamic control of vibration-free displacement of a mobile optical element of said interferometer comprising a guide track, a carriage carrying a payload including said optical element and movable along said guide track, a drive motor by which said carriage is driven along said guide track, drive control means connected to said drive motor and adapted to cause said carriage to be driven according to a predetermined law, flexible linkage means between said payload and said carriage enabling relative movement between said payload and said carriage parallel to the direction of displacement of said optical element, a stabilization control loop independent of said drive control means, an accelerometer carried by said payload, responsive to acceleration of said payload parallel to said direction of displacement of said optical element and connected to said stabilization control loop, an actuator operative between said payload and said carriage under the control of said stabilization control loop, a filter means in said stabilization control loop for filtering signals from said accelerometer, a control loop in said drive control means and a position sensor connected to said control loop and adapted to sense the position of said carriage on said guide track.

14. Interferometer according to claim 13 wherein said vibration-free displacement control device comprises a "cat's eye" reflector in a delay line associated with one telescope.

15. Interferometer according to claim 13 wherein said vibration-free displacement control device carries one telescope which is mobile in a direction passing through said interferometry recombination station.

* * * * *